United States Patent [19]

Mouezy

[11] Patent Number: 5,642,941

[45] Date of Patent: Jul. 1, 1997

[54] HIGH SPEED LINEAR GUIDANCE DEVICE

[75] Inventor: Roger Mouezy, La Roche sur Yon, France

[73] Assignee: Sepro Robotique, La Roche sur Yon, France

[21] Appl. No.: 504,655

[22] Filed: Jul. 20, 1995

[30] Foreign Application Priority Data

Jul. 22, 1994 [FR] France ................. 94 09085

[51] Int. Cl.$^6$ ................. F16C 29/04; F16C 29/12
[52] U.S. Cl. ................. 384/57; 384/58; 384/53; 384/13
[58] Field of Search ................. 384/50, 53, 54, 384/57, 58, 59, 13

[56] References Cited

U.S. PATENT DOCUMENTS

| | | | |
|---|---|---|---|
| 2,336,915 | 12/1943 | Anderson | 384/401 |
| 3,051,535 | 8/1962 | Klint et al. | 384/219 |
| 3,231,317 | 1/1966 | Dudar | 384/624 |
| 3,259,021 | 7/1966 | Appleton et al. | 409/124 |
| 4,013,280 | 3/1977 | Chitayat et al. | 269/60 |
| 4,347,916 | 9/1982 | Schroder | 384/58 X |
| 4,390,216 | 6/1983 | Mueller et al. | 384/54 |
| 4,561,814 | 12/1985 | Dahlgren, Jr. et al. | 409/80 |
| 4,884,898 | 12/1989 | Magnuson | 384/57 X |
| 5,217,308 | 6/1993 | Schroeder | 384/45 |

FOREIGN PATENT DOCUMENTS

| | | |
|---|---|---|
| 0269559 | 6/1988 | European Pat. Off. . |
| 0408854 | 1/1991 | European Pat. Off. . |
| 1390421 | 1/1965 | France . |
| 2527965 | 12/1983 | France . |
| 556101 | 10/1930 | Germany . |
| 3013410 | 10/1981 | Germany ................. 384/53 |
| 3132869 | 3/1983 | Germany ................. 384/57 |
| 4404109 | 10/1994 | Germany . |
| 1-5748 | 1/1989 | Japan . |
| 1-66296 | 3/1989 | Japan . |
| 131320 | 5/1989 | Japan ................. 384/50 |
| 680841 | 11/1992 | Switzerland . |

*Primary Examiner*—Thomas R. Hannon
*Attorney, Agent, or Firm*—Young & Thompson

[57] ABSTRACT

Linear guidance device, of the type comprising a rail defining a path of movement of a movable assembly and rollers secured to the movable assembly. The rollers are mounted in an elastically deformable block (20, 30, 31) so as to apply the rollers (36a–36d) to the rail (17, 27, 42) while exerting a predetermined and substantially constant contact pressure on the guidance rail (17, 27, 42). The elastically deformable block (31) comprises at least two rigid portions (37, 38 or 39) interconnected by an elastic hinge (40 or 41) comprising at least one wall (40 or 41) of small thickness constituting a region of deformation and permitting relative pivoting between the two rigid portions (37–38, 37–39).

8 Claims, 6 Drawing Sheets

HIGH SPEED LINEAR GUIDANCE DEVICE

FIELD OF THE INVENTION

1. Background of the Invention

The invention relates to a high speed linear guidance device.

Linear guidance devices are customarily used as movement sub-assemblies to ensure relative movement of two elements of machines, particularly robotized machines for the provision of automatic transfer or feeding of machine tools.

The linear guidance devices of known type are grouped into three principal families: guidance by sliding elements with metal on metal friction or metal on friction plate, guidance by ball bearings, guidance by the rolling of rollers on rails.

The guidance systems by sliding elements do not permit reaching relatively high speeds, because the friction between two elements in relative displacement and the corresponding consumption of energy increase rapidly when the speed of one element is increased relative to that of the other.

Guidance systems by ball bearings are limited in relative speed because of the friction of the balls on the return elements. Thus, as soon as the relative speed between two elements is substantially greater than 3 meters per second, there exists a high risk of jamming of the balls in their return channel, this jamming rapidly giving rise to destructive blocking of the ball bearing or of the corresponding movement rail.

Guidance systems by guide rollers on rails permit reaching high linear speeds of the order of 8 meters per second for mechanical mountings of high precision. However, it is necessary to maintain the contact pressure of the rollers on the guide rail adjacent a predetermined value for the following reason: an insufficient contact pressure gives rise to friction between the rollers and the rail in the acceleration phases and degrades the contact surfaces of the rail and rollers; too great a pressure produces a jamming and degradation of the surface condition of the rail or roller. Because of the difficulty in maintaining continuously the contact pressure of the rollers on the rail adjacent a predetermined value, this solution of guidance by the rolling of rollers on a rail, which seems at first glance easy to carry out and economical to use, requires in reality the utilization of precision techniques as to the construction, mounting and adjustment when high displacement speeds up to 8 meters per second over large displacement paths of the order of several meters, are sought.

2. Summary of the Invention

The invention has for its object to overcome the drawbacks of the prior art, by providing a new high speed linear guidance device, which can reach 10 meters per second, over large displacement ranges of the order of several meters.

The invention has for its object a linear guidance device of the type comprising a rail defining a path of movement of a movable assembly and rollers carried by said movable assembly, the rollers being mounted on an elastically deformable block, so as to apply the rollers to the rail while exerting a predetermined and substantially constant contact pressure on the guide rail, the elastically deformable block comprising at least two rigid portions interconnected by means forming an elastic hinge, characterized in that the means forming an elastic hinge comprise at least one wall of small thickness constituting a region of deformation and permitting relative pivoting between said two rigid parts.

According to other characteristics of the invention:

the device comprises moreover means for adjusting the contact pressure of the rollers on the guide rail;

said adjustment means is an elastic means applying the force of a spring or the like to said elastically deformable block;

the device comprises stabilization means against rotation of said movable assembly about said displacement path;

said stabilization means in rotation comprise rollers secured to said movable assembly which roll on a secondary rail substantially parallel to the rail defining the displacement path of the movable assembly;

at least one pair of rollers is mounted on a common support articulated on said block in the manner of a bogie;

the device comprises automatic lubricating means for the contact surfaces between the rollers and the rail;

said automatic lubricating means comprises an elastic applicator member of a hard grease stick on said rail defining the displacement path of the movable assembly;

the hard grease stick comprises one or several inserts preferably of fibrous material, adjusting the consumption of grease by friction on the rail;

the stick comprises at its rear end, a colored grease layer showing the wear of the stick by deposition on the rail of a colored layer easily detectable by the eye.

BRIEF DESCRIPTION OF THE DRAWINGS

The invention will be better understood from the description which follows given by way of non-limiting example with reference to the accompanying drawings, in which.

DETAILED DESCRIPTION OF THE PREFERRED EMBODIMENTS

Figure 1:
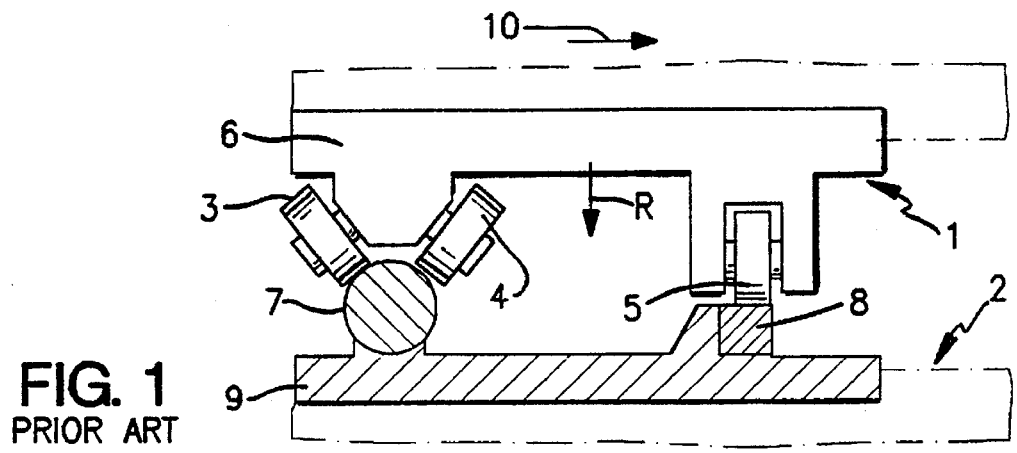
FIG. 1 shows schematically a view in cross section transversely of the direction of movement of a device according to the prior art.

Referring to FIG. 1, a movable assembly 1 according to the prior art, movable with respect to a fixed assembly 2, comprises rollers 3, 4 and 5 mounted on a block 6 and rolling respectively on a principal rail 7 defining the path of movement of the movable assembly 1 and on a secondary rail 8 constituting a stabilization means against rotation of the movable assembly 1 about the path of movement defined by the principal rail 7.

The rollers 3, 4 and 5 are mounted on the lower portion of the block 6, while the principal and secondary rails 7 and 8 are secured to a support chassis 9.

The illustrated guidance device comprises, in the case of a movable assembly 1 subjected to forces applied particularly between the rollers 4 and 5 and whose resultant comprises a component R applied between the two rails 7 and 8, a plurality of rollers disposed along variable numbers of lines. By way of example, the block 6 can comprise a pair of rollers 3, a single roller 4 and a single roller 5 in the case in which the forces applied to the movable assembly 1 were to urge the movable assembly 1 in the direction from the principal rail 7 toward the secondary rail 8, which is to say in the direction corresponding to the arrow 10.

Figure 2:
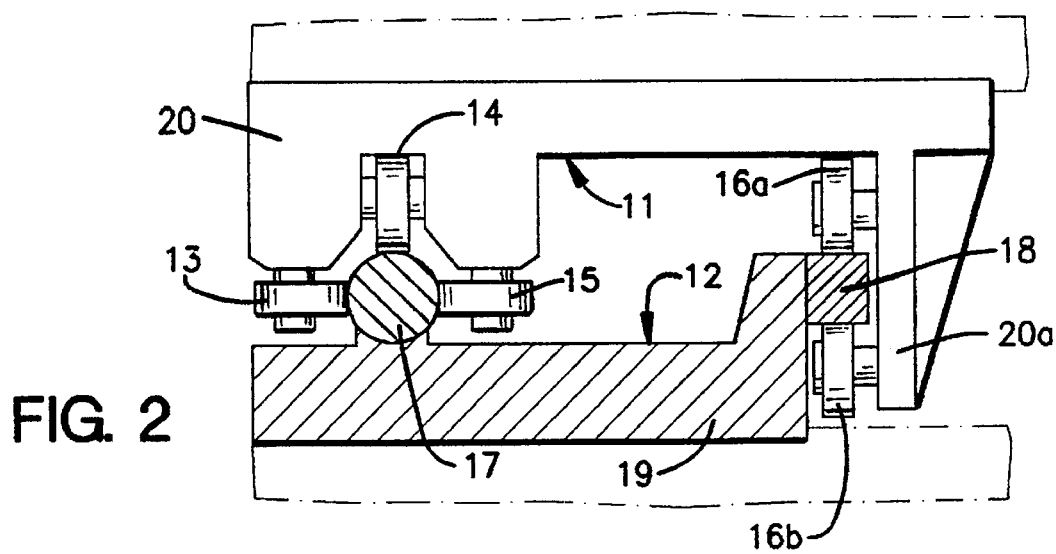
FIG. 2 shows schematically a view in transverse cross section relative to the direction of displacement of a first embodiment of a device according to the invention.

With reference to FIG. 2, a movable assembly 11 according to the invention moves relative to a fixed assembly 12 being guided along a path defined by the rolling of rollers 13, 14, 15 on a principal rail 17 and rollers 16a, 16b on opposite sides of a secondary rail 11. The principal rail 17 defining the path of movement of the movable assembly 11 and the secondary rail 18 are parallel to each other and mounted fixedly on a fixed table 19 of the fixed assembly 12. The elastically deformable block 20 on which are mounted the rollers 13, 14, 15, 16a and 16b has a right-angled shape 20a supporting rollers 16a and 16b rolling on opposite sides of the secondary rail 18 forming a stabilization means against rotation about the path of movement defined by the principal rail 17.

The device according to the invention comprises an elastically deformable block of a rigid material adapted to permit a slight elastic deformation; as an example of usable material, can be cited metallic materials, composite materials or synthetic materials of the "plastic materials" type. The blocks of the device according to the invention are preferably formed from the recited material in the form of sectionable shapes of a length to constitute a support block of rollers of predetermined length: to provide profiles from an above-mentioned material, there are used processes of the type: drawing of light aluminum alloy, extrusion of plastic material or composite material, etc.

This manner of manufacture gives profiles comprising elongated grooves adapted to receive rollers and defining regions of deformation forming elastic springs connecting two rigid portions of the support block of the rollers. The elastic spring of one block is constituted preferably in the form of a wall of small thickness constituting a region of elastic deformation which permits relative pivoting between the two rigid portions each supporting one line of rollers. The securement of the rollers and the adaptation of a section of profile to the number of lines of rollers and to the number of rollers per line requires only simple machining of the type of piercing, tapping or boring: the simplicity of these machining operations does not require particular precision, thereby permitting automatic and economical manufacture of the support blocks of rollers constituting guide modules of 1, 2 or 3 lines of rollers rolling on a guide rail defining a path of movement.

Figure 3:
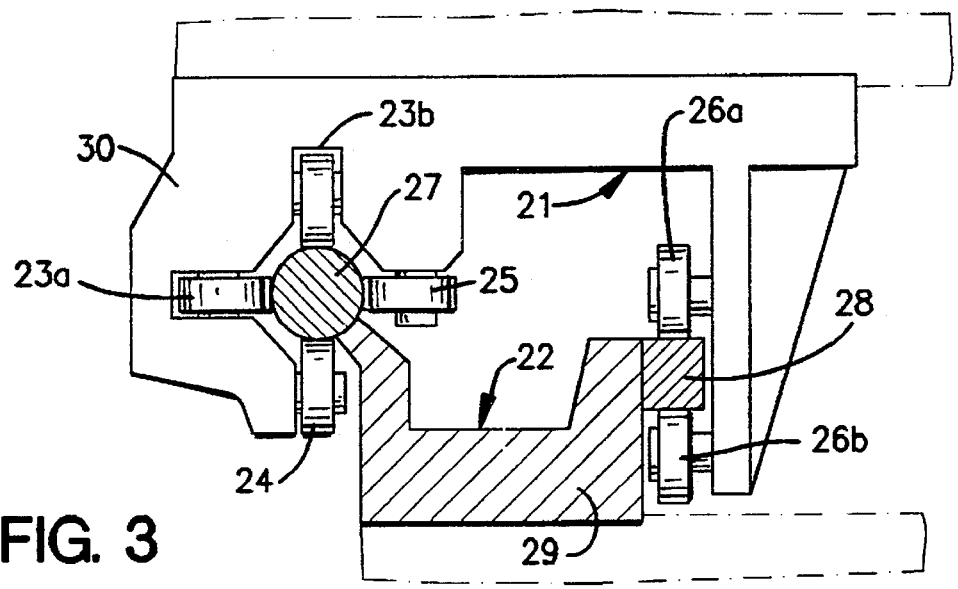
FIG. 3 shows schematically a view in transverse cross section relative to the direction of displacement of a second embodiment of a device according to the invention.

With reference to FIG. 3, another device according to the invention comprises a movable assembly 21 movable relative to a fixed assembly 22. Rollers 23a, 23b, 24, 25, 26a, 26b move respectively along a rail 27 of circular or polygonal cross section defining a path of movement and on opposite sides of a rail 28 for immobilization against rotation. These rails 27 and 28 are both secured to a support table 29 of the fixed assembly 22. The mounting of the rollers 23a, 23b, 24, 25, 26a and 26b on the elastically deformable block 30 is carried out so as to control the contact pressure of the mentioned rollers on the rails 27 and 28 whilst maintaining substantially constantly a predetermined contact pressure on the rails and while maintaining constant the distance between the axes of rotation of each pair of opposed rollers from each other relative to a guide rail, which is to say whilst maintaining constant the interaxial distance of the rollers 23a and 25, the rollers 23b and 24 as well as the rollers 26a and 26b. To this end, there is provided in the block 30 a rigid core assimilable to a reference square supporting the rollers 23a and 23b, which rigid core is connected by regions of small thickness adapted to deform elastically, to the supports of the rollers 24 and 25. Whilst deforming elastically, each region of small thickness constitutes an articulation hinge permitting oscillation of a support for rollers 24 and 25 relative to the rigid core of the block, which ensures regular contact and constant contact pressure of the rollers 24 and 25 opposed to the rollers 23b and 23a respectively relative to the guide rail 27.

Figure 4:
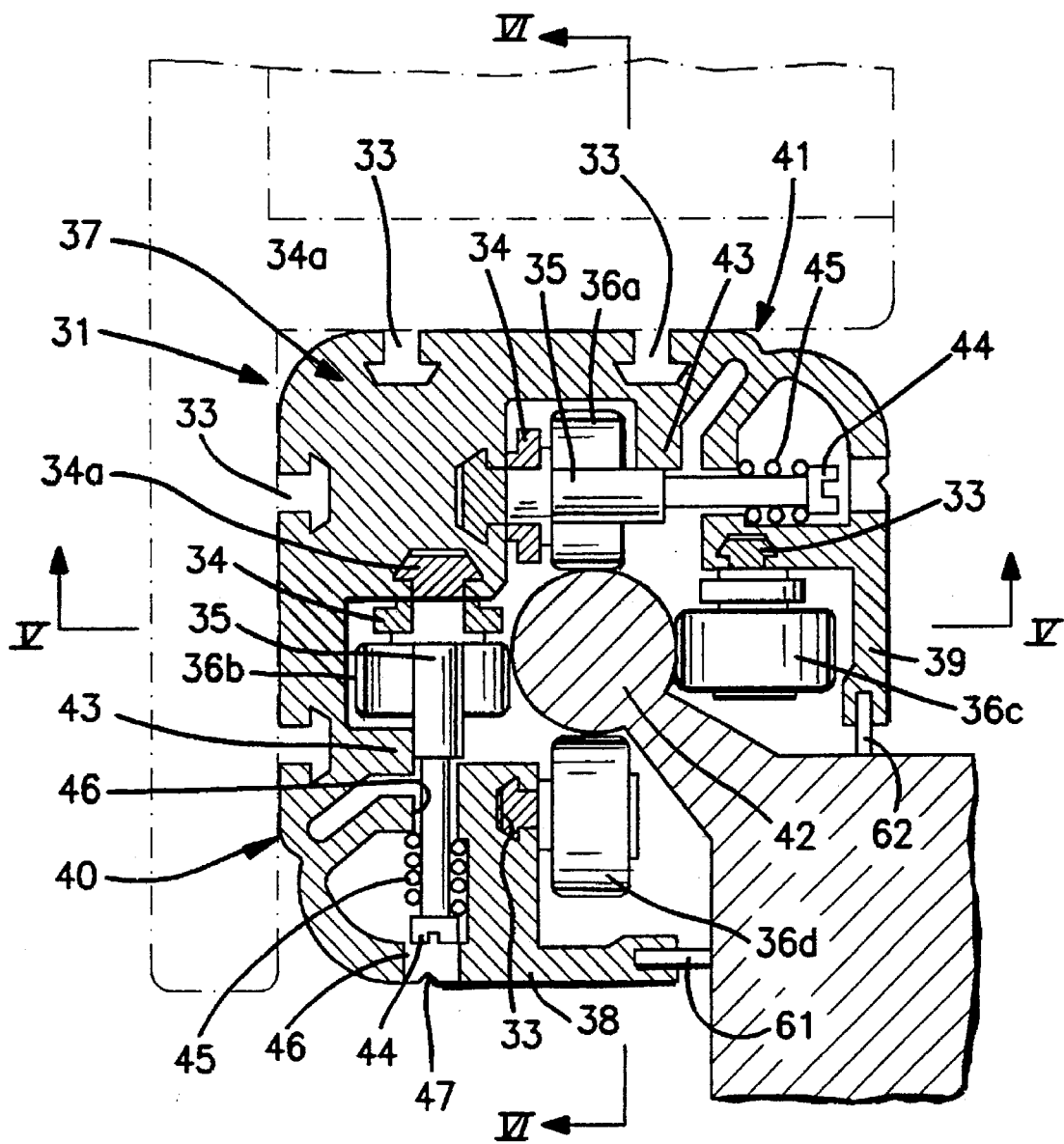
FIG. 4 shows schematically a fragmentary cross-sectional view in the direction of movement, of another embodiment according to the invention.
Figure 5:
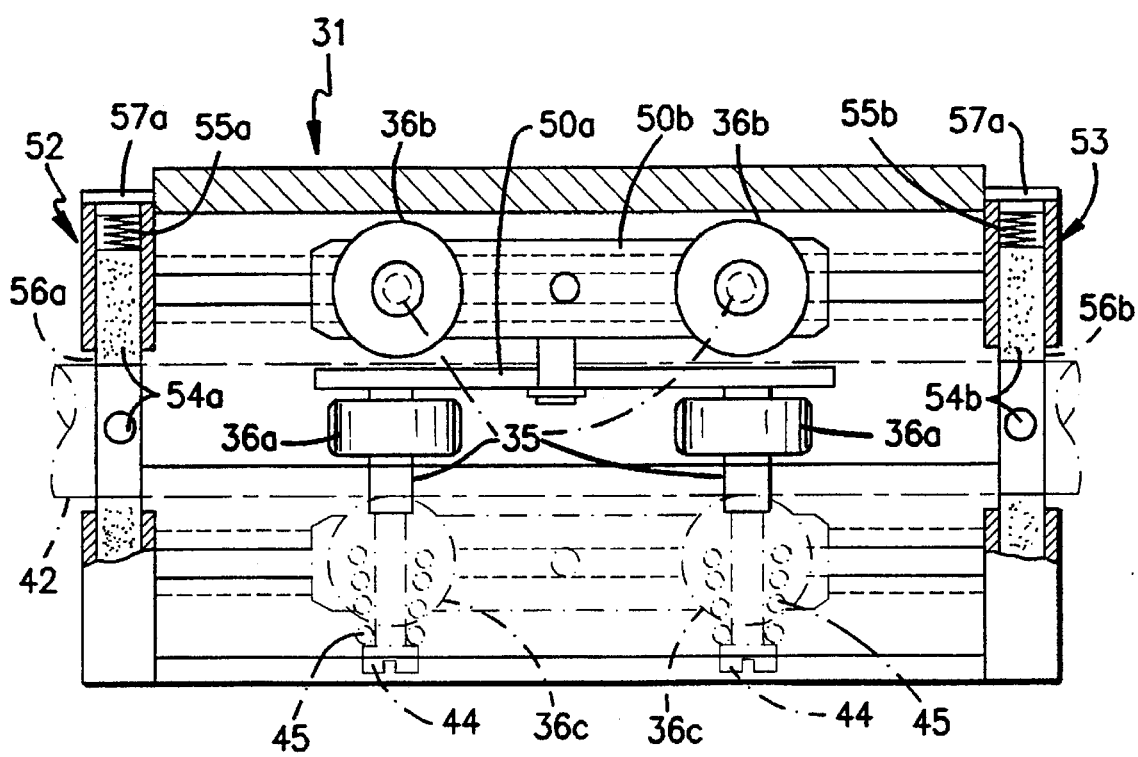
FIG. 5 shows schematically a view in longitudinal cross section on the line V—V of FIG. 4 of a device according to the invention.
Figure 6:
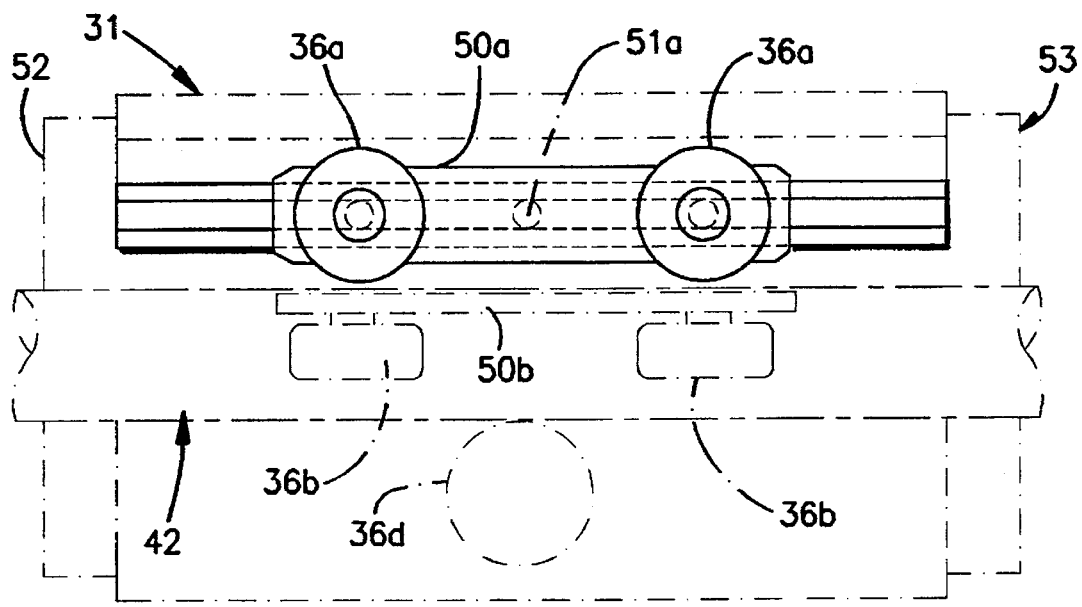
FIG. 6 shows schematically a view in longitudinal cross section on the line VI—VI of FIG. 4 of a device according to the invention.

With reference to FIGS. 4, 5 and 6, a preferred embodiment of the invention comprises a block 31 of a profiled section having a constant cross section, forming a displacement module with the help of rollers, relative to a fixed assembly. The block 31 has a substantially rectangular external contour, in which is provided a large number of grooves 33 of T shape. The T-shaped grooves permit the securement of external plates or squares represented in broken lines or receive the guiding ends 34a of support plates 34 in which are supported the rotation axles 35 of the rollers 36a to 36d.

The block 31 thus permits the emplacement of four lines of rollers 36a, 36b, 36c and 36d. The block 31 comprises a rigid portion having a reinforced structure 37 defining a square constituting a guide reference and carrying the two principal guide rollers 36a and 36b. The lines of rollers 36c opposite to 36b and 36d opposite to 36a are supported by structural members 38 and 39 of the block 31 which are connected to the portion 37 constituting a rigid core, by regions of low thickness 40 and 41. Each wall 40 or 41 of low thickness operates as an elastic hinge and constitutes a region of elastic deformation which permits relative pivoting between the rigid parts 37 and 38 or 37 and 39.

A constant pressure of the rollers 36a to 36d on the cylindrical or polygonal rail 42 secured to the fixed assembly 32 is thus predetermined by the closeness to or distance between the rigid parts 37 and 38 or 37 and 39, this approach or spacing depending on the deformation of a region forming an elastic hinge such as 40 or 41.

The positioning in squared relationship of the contact surfaces of the rollers 36a and 36b with the rail 42 is obtained thanks to the fact that the axle 35 of rotation of one roller 36a or 36b is maintained on the one hand by a T-shaped groove of the type of 33 and bears on the other hand against a shoulder or heel 43 of one-piece construction with the rigid block 31, directly during production of the profile from which is manufactured the elastically deformable block 31 by simple sectioning.

To adjust precisely the contact pressure of the rollers 36c and 36d on the rail 42, there is preferably provided a simple adjustment means such as a screw 44 engaged in an axial screw-threaded hole 35 in the roller 36a or 36b and communicating resulting elastic force for example by the compression of a spring 45 to each region of elastic deformation 40 or 41, so as to space apart or to bring together elastically the rigid portions 37 and 38, or 37 and 39. Thus, the invention ensures the application under pressure with controlled force, of the rollers 36a and 36d, 36b and 36c on opposite sides of the guide rail 42, and this in an elastic manner, which permits absorbing any possible irregularities or surface faults of the rail 42 resulting from wear or undesirable shock.

To permit the adjustment of the passage of the adjustment screw 44, it suffices to provide two holes 46 along the axis of one positioning groove 47 of V shape, of one-piece construction with the profile corresponding to the section of the block 31.

In the case of movement modules guided linearly by the rail 42 and adapted to carry heavy loads, the single rollers could be replaced by double rollers 36a, 36b mounted pairwise on common supports 50a, 50b articulated in rotation by means of an axle 51a, 51b with a rigid portion of a movable block 1. This articulation on a common support 50 in the manner of a bogie permits distributing the load fractionally onto each roller of the pair. Likewise, without departing from the scope of the present invention, the cylindrical rollers could be replaced by rollers of a shape adapted to the contour of the guide rail and mounted in an elastically deformable block analogous to the block described with reference to FIGS. 1 to 6.

Preferably, the regions of small deformation forming elastic hinges (for example 40 or 41) are located substantially in prolongation of the axis of rotation of the rollers (such as 36c and 36d in FIG. 4) and at the ends of the geometric reference configuration (rigid block 37 defining a square) for guiding the movable module along the corresponding rail. This arrangement ensures an adjustable displacement of the rollers 36c and 36d according to a purely rotational displacement movement and thus ensures continuous contact perpendicular to the adjustable roller 36c or 36d with the rail 42 to which it applies a predetermined contact pressure.

Figure 7:
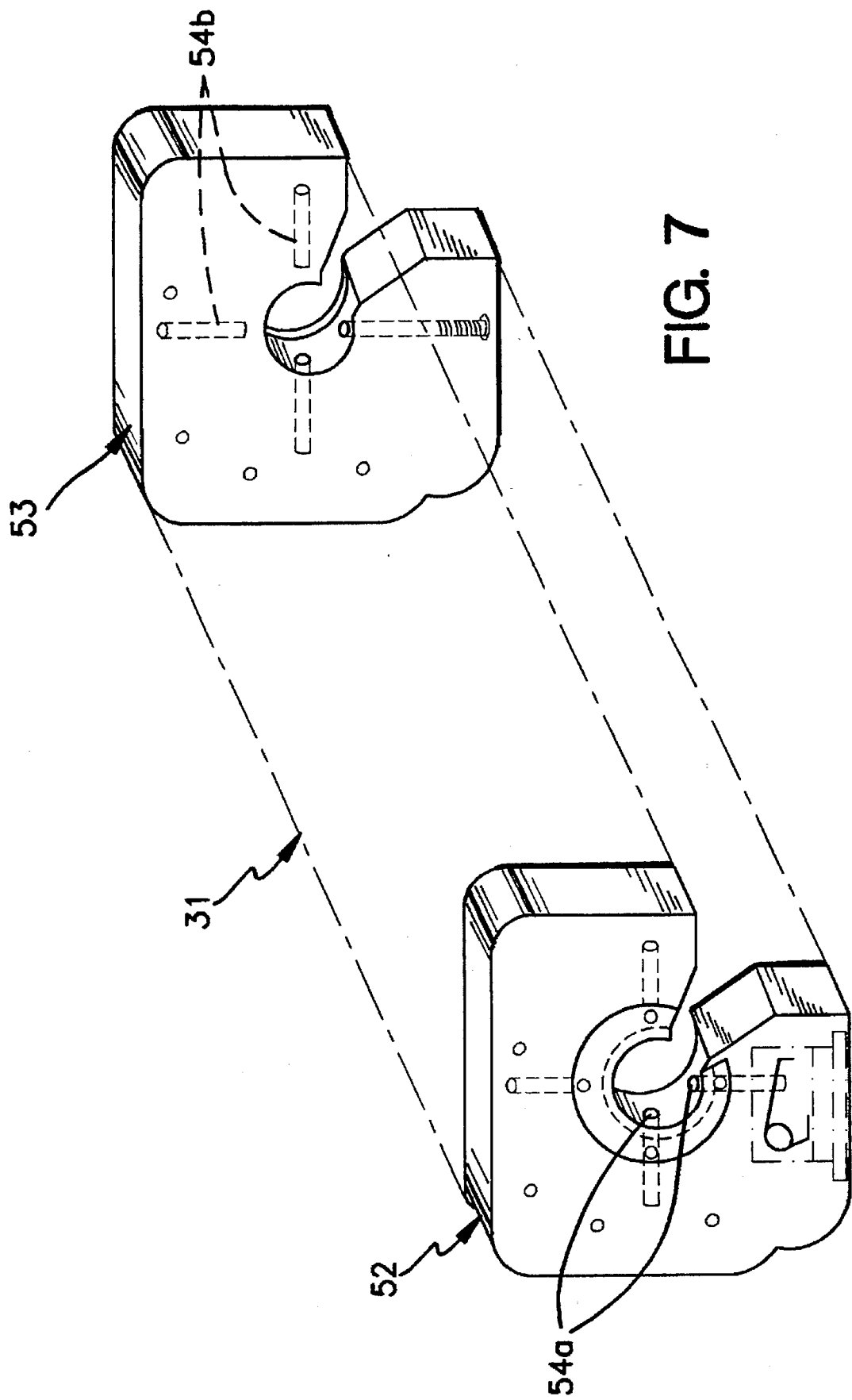
FIG. 7 shows schematically a view in perspective partially broken away, of a casing of a device according to the invention.

With reference to FIGS. 5 to 7, according to a preferred modification of the invention, the device comprises an automatic greasing means for the contact surfaces between the rollers and the rail.

To this end, it is provided to fix at each end of one block 31, closure plates 52, 53 serving as covers and comprising at the level of each line of rollers 36a to 36d, lubricant or grease distribution means: there could for example be used a felt soaked in oil and supplied by a regulating distribution system for oil, which requires however an adjustment of the flow of lubricant fluid so as to avoid flooding with oil adapted to pollute or to damage the immediate environment of a machine comprising a device according to the invention.

In the illustrated embodiment, there is arranged on each guide rail in the line of geometric contact of a roller 36a to 36d on the rail 42, a thin film of grease disposed regularly by friction: to this end, a stick 54a, 54b having a waxy composition is applied against the contact surface between the roller and the rail while being elastically prestressed by a spring 55a, 55b or equivalent elastic means.

Tests have shown that the consumption of grease sticks is very low and that the lifetime of these sticks 54a, 54b is of the order of one year of use in normal service. The production of an end plate 52 or 53 serving as a cover is carried out preferably by molding while indirectly providing the channels for reception, of grease sticks 54a, 54b. These channels 56a, 56b are closed by covers 57a, 57b directly bearing a spring 55a, 55b or alternatively simply closing the recited channels, whilst the function of elastic pressure on the grease stick is ensured by an independent flexure spring which applies the grease stick against the rail. The wear of the grease stick is noted by visual observation through a transparent surface, or by automatic detection of the low position of an intermediate pusher displaceable with the stick or coming into contact with the linear guidance rail.

According to environmental conditions (high temperature, structural vibration), the quantity of grease deposited by wear of the friction sticks on the rails can become greater than the quantity strictly necessary to obtain the intended result. To limit the consumption and to have optimum autonomy, there can be provided in the structure of the stick inserts of fibrous material (for example wood or synthetic fibers) whose nature and dimensions permit adjusting the consumption of grease, the wear by friction on the rail of said inserts being unaffected by the environmental conditions mentioned above.

These consumption adjustment members can be easily integrated into the structure of the sticks at the time of molding these latter. Advantageously, there can be introduced at the rear end of the sticks, along several millimeters of their length, a grease composition strongly charged with coloring material which will deposit on the rail a colored film easily detectable by the eye to indicate the limit of wear of the grease stick, and the need to replace it within several days.

A scraper joint disposed on the cover cleans the contact surface between the rollers and the rail before greasing and disposes of foreign bodies and various pollutants adapted to cover the contact surfaces between the rollers and the rail.

In a similar manner, sealing joints or elements 61, 62 are provided to isolate completely from the outside the space corresponding to rolling contacts between roller and rails, by enveloping completely the guide rail or rails and by isolating the support portions of these guide rails from the outside. The sealing elements of known type of the lipped joint type, longitudinal brush, multiple interstitial seal or the like can be used for this purpose.

For particular applications, these sealing elements permit the omission of the guidance sealing block constituted (FIG. 4) by closure with the help of end covers integrating the greasing of the contacts between rollers and rails, which avoids any risk of chemical or other contamination by penetration to within the interior of the guidance block.

The movable assemblies provided according to the invention permit obtaining, with excellent precision and optimum load bearing characteristics, guided movements along long paths with high speeds, and this with excellent reliability, and economical manufacture and use. The invention described in reference to particular embodiments is not thereby limited, but on the contrary covers any modification of shape and variation of embodiment within the scope of the spirit of the invention.

Figure 8:
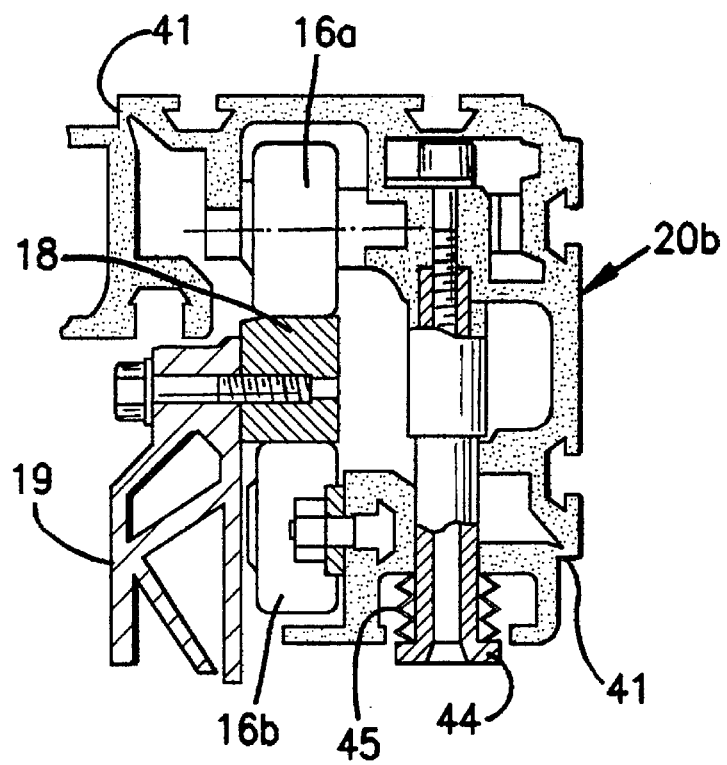
FIGS. 8 to 10 show schematically views in transverse cross section relative to the direction of movement, of modified embodiments of the devices of FIGS. 2 and 3.
Figure 9:
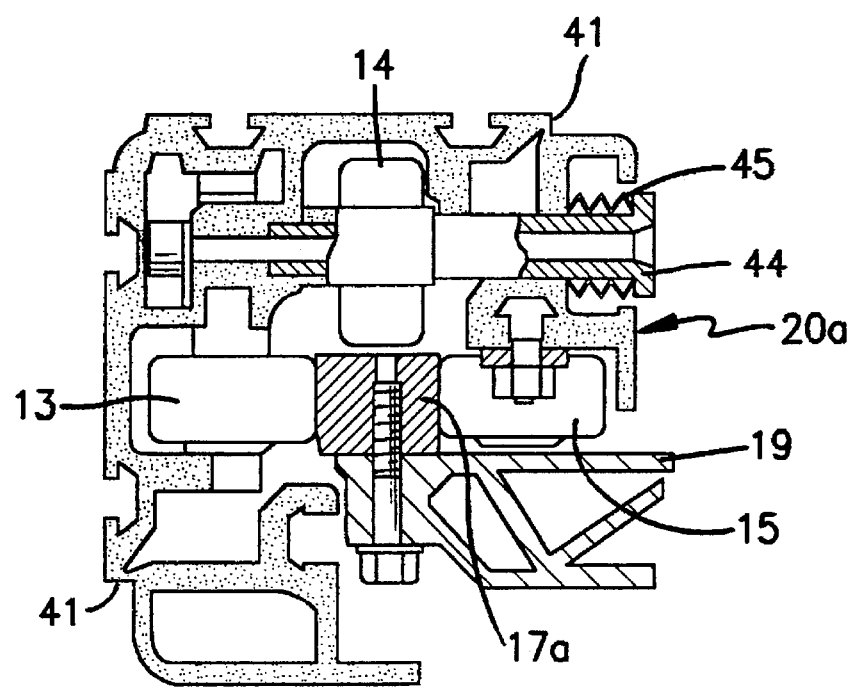

With reference to FIGS. 8 and 9, a first anti-rotation device with two rollers 16a, 16b is shown moving along a rail 18 of rectangular section secured to a fixed beam 19, as described with reference to FIG. 2.

The rollers 16a, 16b are mounted on a section of profile of the type described with reference to FIG. 4 and comprising two regions 40 and 41 forming an elastically deformable hinge so as to apply a predetermined contact pressure by adjustment of the screw 44 comprising an assembly 45 of Belleville washers.

In the example of mounting two rollers in FIG. 8, only the elastic hinge 41 is used for the adjustment of the predetermined contact pressure of the rollers on the rail.

A second guidance device with three rollers 13, 14, 15 is shown on a rail 17a of rectangular cross section secured to a fixed assembly 19.

The adjustment of the contact pressure is effected in an analogous manner by adjustment, with the help of the screw 44 acting on the stack of Belleville washers 45, of the deformation of the elastic hinge 41.

Figure 10:
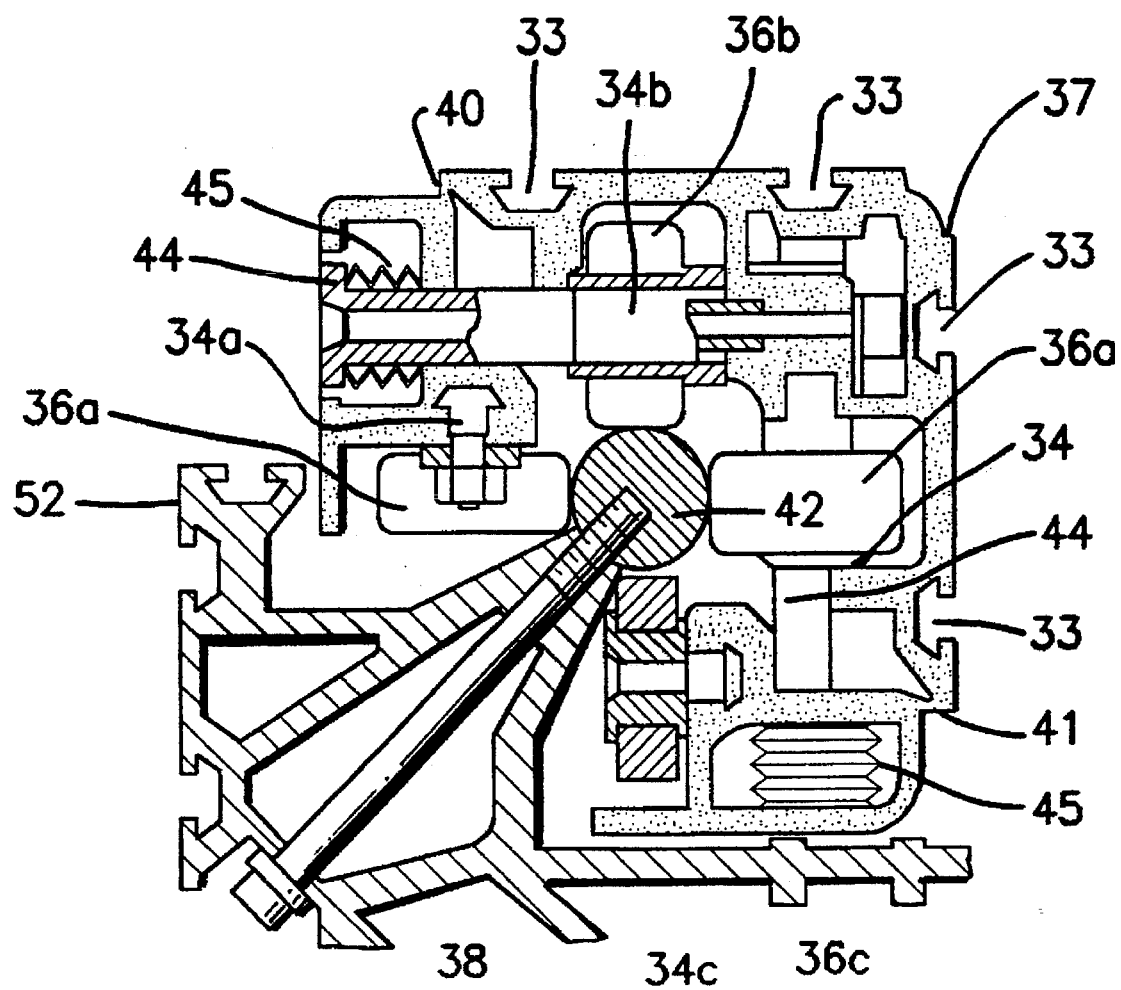

Referring to FIG. 10, the elements with reference numerals identical to the reference numerals of FIG. 4 designate identical or functionally-equivalent elements to those of FIG. 4.

The lines of rollers 36a to 36d are in this example comprised by individual rollers which are mounted on an axle 34a forming a tenon within a groove 33 forming a mortise, on a bearing 34b traversed by an adjustment screw 44, on a bearing 34c secured to a rigid portion and on a bearing 34d traversed by another adjustment screw.

The guidance reference square is defined in this example by the rigid portion 37 carrying the rollers 36b and 36d, and the regions of small thickness 40 and 41 forming an elastic hinge are both used to adjust the predetermined contact pressure of the rollers on the rail.

Thus, thanks to the invention, it is possible to use the same profiled section as shown in FIGS. 8, 9 and 10 to effect the mounting, either of two lines of opposed rollers (FIG. 8), or of three lines of rollers (FIG. 9), or of four lines of rollers (FIG. 10). The use of the same profile for various types of possible mountings permits economical mass production, the only machining operations required being the piercing for screw holes or tensioning bolts and the springs or corresponding elastic means.

I claim:

1. A linear guidance device comprising:

a rail defining a path of movement of a movable assembly and rollers secured to said movable assembly;

the rollers being mounted in an elastically deformable block (20, 30, 31) so as to apply the rollers (36a–36d) to the rail (17, 27, 42) while exerting a predetermined and substantially constant contact pressure on the guidance rail (17, 27, 42);

the elastically deformable block (31) comprising at least two rigid portions (37, 38 or 39) interconnected by means forming an elastic hinge (40 or 41), the means forming an elastic hinge comprising at least one wall (40 or 41) of small thickness constituting a region of deformation and permitting relative pivoting between said two rigid portions (37–38, 37–39); and means for adjustment (44, 45) of the contact pressure of the rollers on the guidance rail;

said adjustment means comprising an elastic means (44, 45) applying the force of a spring (45) to said elastically deformable block (31).

2. Device according to claim 1, which further comprises a stabilization means (16a, 16b, 18; 26a, 26b, 28) against rotation of said movable assembly about said path of displacement.

3. Device according to claim 2, wherein said stabilization means against rotation comprises rollers (16a, 16b; 26a, 26b) secured to said movable assembly which roll on a secondary rail (18, 28) substantially parallel to said rail (17, 27) defining the path of movement of the movable assembly (1, 11, 21).

4. Device according to claim 1, wherein at least one pair of rollers (36a, 36b) is mounted on a common support (50a, 50b) articulated (51a, 51b) on said block (31) in the manner of a bogie.

5. Device according to claim 1, which further comprises automatic greasing means for the contact surfaces between the rollers (36a, 36d) and the rail (42).

6. Device according to claim 5, wherein said automatic greasing means comprises a member (55a, 55b) for resilient application of a hard grease stick (54a, 54b) against said rail (42) defining the path of movement of the movable assembly.

7. Device according to claim 6, wherein the hard grease stick (54a, 54b) comprises at least one insert of fibrous material, thereby adjusting the consumption of grease by friction on the rail (42).

8. Device according to claim 6, wherein the stick (54a, 54b) comprises at its rear end a colored grease layer showing the wear of the stick by deposit on the rail (42) of a colored film readily detectable by the eye.

* * * * *